United States Patent Office 3,405,376
Patented Oct. 8, 1968

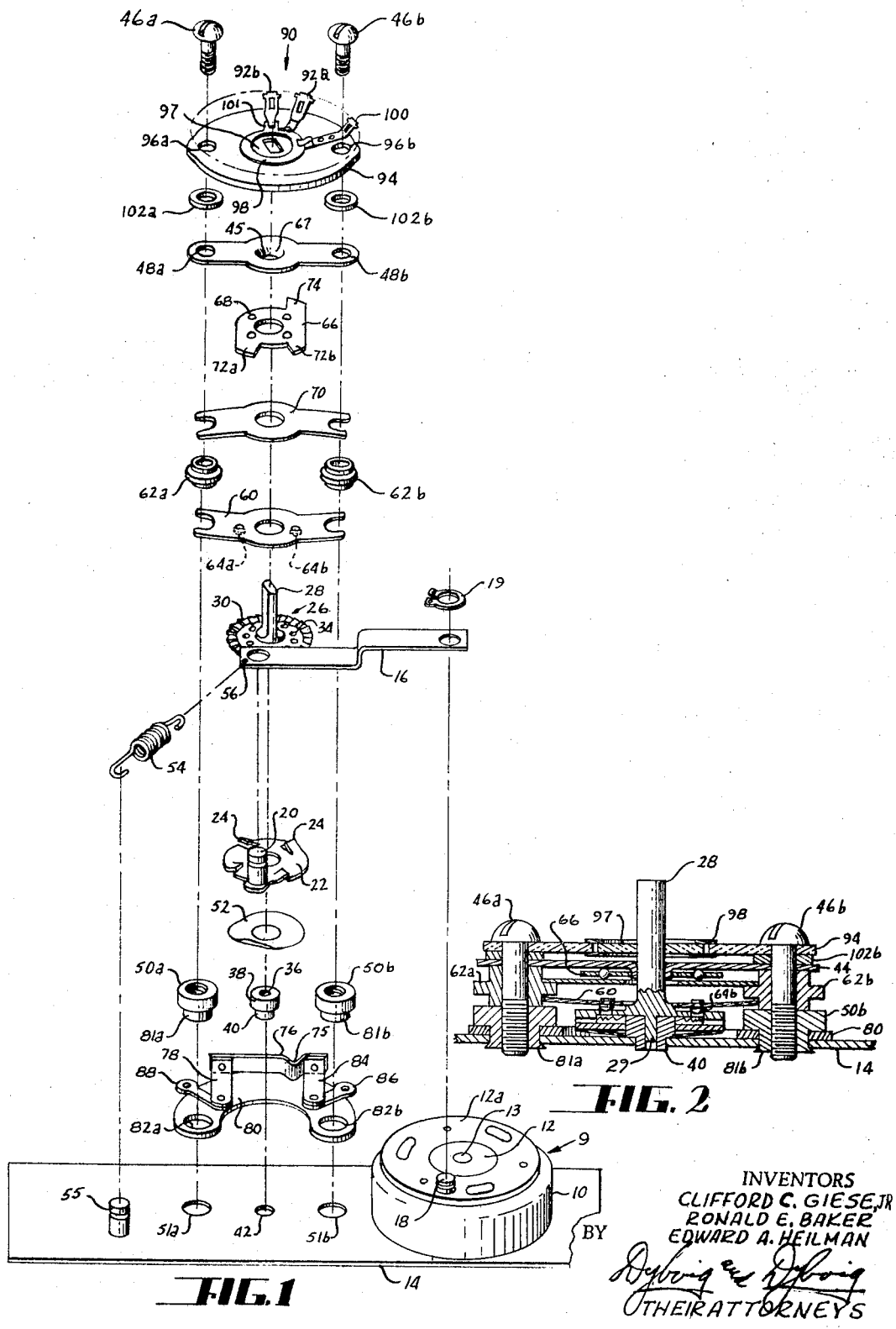

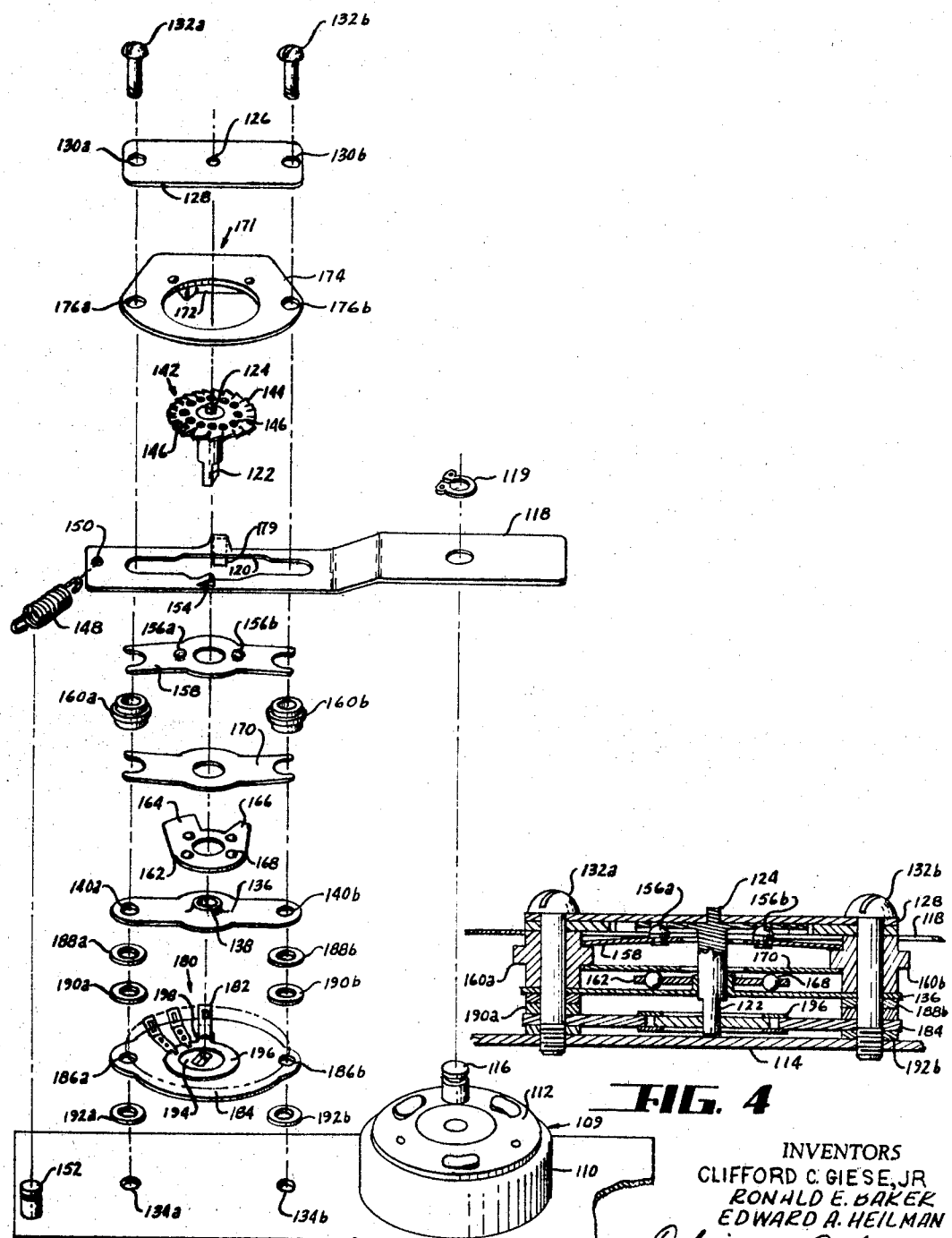

3,405,376
ROTARY STEPPING MECHANISM
Clifford C. Giese, Jr., Kettering, and Ronald E. Baker and Edward A. Heilman, Dayton, Ohio, assignors to Ledex Inc., Dayton, Ohio, a corporation of Ohio
Filed Mar. 15, 1966, Ser. No. 534,463
15 Claims. (Cl. 335—138)

ABSTRACT OF THE DISCLOSURE

A stepping mechanism for driving a rotary switch is produced by mounting a reciprocating type rotary actuator adjacent the rotary switch so that the rotary axis to the switch is spaced from and parallel to the rotary axis for the actuator. A driving connection is provided by a link transverse to the aforementioned parallel axes. In one embodiment, the link is pivotally connected to a driving ratchet mounted for rotation about the driven switch axis and transmits the reciprocating movements of the rotary actuator to the driving ratchet. A driven ratchet cooperating with the driving ratchet provides a one-way drive between the driving ratchet and the rotary switch so as to unidirectionally step the driven switch.

In a second embodiment, the link carries a pawl which cooperates with a driven ratchet to unidirectionally step the rotary switch.

---

This invention relates to a rotary stepping mechanism and more particularly to an electromagnetically operated stepping mechanism of uniquely compact design, however, the invention is not necessarily so limited.

There are numerous applications, as in armament firing systems, for a mechanism which will supply a burst of signals comprising a controlled number of accurately timed electrical pulses. Such devices are frequently termed intervalometers and in some cases, particularly armament applications, are termed ripple firing devices. In the past, intervalometer devices have tended to be bulky and massive and thus unsuitable to many applications, especially aircraft and missile applications.

An object of the present invention is to provide a new and improved intervalometer.

Another object of the present invention is to provide an improved intervalometer mechanism of compact construction.

Still another object of the present invention is to provide a new and improved transfer mechanism for transferring reciprocal motions from a source of power to a rotatably driven load.

Other objects and advantages reside in the construction of parts, the combination thereof, the method of manufacture and the mode of operation, as will become more apparent from the following description.

In the drawings,

FIGURE 1 is an exploded perspective view illustrating one embodiment of the present invention.

FIGURE 2 is a fragmentary sectional view illustrating a portion of the embodiment of FIGURE 1 after assembly thereof.

FIGURE 3 is an exploded perspective view illustrating a modification.

FIGURE 4 is a fragmentary section view illustrating a portion of the modification after assembly thereof.

The present invention includes a novel assembly of mechanical elements which is utilized to transfer a limited reciprocal motion from a prime mover to a driven load. Those skilled in the art will recognize that any prime mover capable of delivering limited reciprocal movements can be attached to the disclosed transfer assembly for accomplishing the intended results of the present invention. For the purpose of fully illustrating the present invention, however, a preferred type of prime mover is illustrated in the drawings.

The preferred prime mover is an electromagnetically powered limited stroke rotary actuator 9 of the type fully disclosed in United States Patent No. 2,496,880, issued to George H. Leland, Feb. 7, 1950. The rotary actuator 9 comprises an electromagnet, not shown, assembled in a housing 10. The electromagnet, when energized, attracts an armature 12 fixed to a shaft 13. The armature 12 carries a plate 12a which, by means of inclined surfaces formed thereon and cooperating inclined surfaces formed on the confronting face of the housing 10, together with ball elements interposed between the inclined surfaces, is caused to rotate as the armature 12 is attracted toward the electromagnet. The rotary stroke thus produced in the plate 12a is limited by the aforesaid inclined surfaces, which trap the balls rolling thereon after a fixed amount of rotary travel, and, accordingly the rotary output of the actuator 9 is accurately characterized as a limited rotary stroke.

The actuator illustrated must be reset at the end of each rotary output stroke. Thus after the armature 12 has been attracted to the electromagnet to produce the rotary stroke it is necessary to return the armature 12, and the plate 12a carried thereby, to their initial position so as to prepare the actuator for a second output stroke. In the present invention this is accomplished by causing the plate 12a to rotate against a spring bias which induces a counter rotation of the plate 12a as soon as the electromagnet is deenergized. This counter rotation resets the actuator so that a new rotary stroke can be executed whenever the electromagnet is again energized.

The rotary motion produced in the plate 12a by the actuator 9 is transferred to a ratchet wheel 22 by means of an arm or link 16. The arm 16 is attached at one end to a pivot pin 18 mounted on the plate 12a and locked to the pin 18 by means of a snap ring 19. The opposite end of the arm 16 is pivotally attached to a pivot pin 20 mounted on a ratchet wheel 22.

The ratchet wheel 22 is journalled for rotation on a bushing 38 having a cylindrical projection 40 seated in an aperture 42 in the base 14. As will appear more fully in the following, the bushing 38 cooperates with other elements of a stationary assembly to establish a rotary axis which is spaced from and parallel to the rotary axis of the actuator, as defined by the shaft 13.

The ratchet wheel 22 is equipped with peripherally spaced axially inclined teeth or pawls 24 which engage with teeth of a confronting ratchet plate 26. Fixed to the ratchet 26 is a shaft 28 having a double D section throughout most of its length. Projecting downwardly from the shaft 28, as viewed in FIGURE 2, is a pilot 29 journalled for rotation in an aperture 36 of the bushing 38. The upper end of the shaft 28, where the shaft has a double D section, is journalled for rotation in an aperture 45 of a plate 44.

The plate 44 is secured against rotation by means of screws 46a and 46b which enter apertures 48a and 48b of the plate 44 and threadedly engage in nuts 50a and 50b staked into openings 51a and 51b in the plate 14. The plate 44, in cooperation with the bushing 38, accurately establishes the axis of rotation for the shaft 28.

The ratchet 26 has a plurality of peripherally spaced teeth 30 inclined axially out of the plane of the ratchet so as to each have an axially disposed radially extending edge or wall cooperating with an inclined surface of an adjacent tooth to define a notch bounded by said wall and the adjacent inclined surface. The direction of inclination of said teeth is such that the edges of the teeth 24 of the ratchet wheel 22 will engage the edges of the teeth 30 of the ratchet 26 upon counterclockwise rotation of the ratchet wheel 22, as viewed in FIGURE 1. Upon clockwise rotation of the ratchet wheel 22, the inclined surfaces of the teeth 24 in the ratchet wheel 22 cam against the inclined surfaces of the teeth 30 of the ratchet 26 causing the ratchet members 22 and 26 to separate axially and slide one relative to the other without applying a rotary torque to the ratchet 26.

In the preferred construction, the actuator 9 induces the plate 12a to rotate in the counterclockwise direction, as viewed in FIGURE 1. Thus the arm 16 which transmits this rotation to the ratchet wheel 22 drives the ratchet wheel 22 in a counterclockwise direction upon energization of the actuator 9. This is the direction in which the ratchet wheel 22 positively drives the ratchet 26.

During this positive drive movement, the arm 16 is drawn from left to right as viewed in FIGURE 1. Seated in an aperture 56 at the left end of the arm 16 is a spring 54 having its opposite end hooked around a post 55 fixed to the plate 14. The left to right movement of the arm 16 during the power stroke of the actuator 9 thus tensions the spring 54.

Upon subsequent deenergization of the actuator, the spring 54 is effective to draw the arm 16 from right to left as viewed in FIGURE 1 imparting a counter rotation to the plate 12a of the actuator and thereby resetting the actuator for a future operation. At the same time the arm 16 imparts a counter rotation to the ratchet wheel 22, but the teeth 24 on the ratchet wheel 22 slip under the teeth 30 of the ratchet 26 without imparting any torque to the ratchet 26.

Thus, during the power stroke of the actuator 9, torque is applied to the ratchet 26 and during the reset action powered by the spring 54 no torque is applied to the ratchet 26.

Clearly this type of drive results in a stepwise unidirectional rotary movement of the ratchet 26, the ratchet members 22 and 26 operating as a one way clutch mechanism. The stepwise movement of the ratchet 26 is held to precisely controlled increments by means of a detent assembly including a circular array of perforations 34 in the ratchet 26, this circular array being concentric to the axis of the shaft 28. The perforations 34 are positioned to be engaged by detents 64a and 64b press fitted into and thereby fixedly attached to a lightly curved spring member 60.

The spring member 60 is bifurcated at each end to engage spacer elements 62a and 62b secured by the screws 46a and 46b, respectively. Enlarged shoulders on the spacers 62a and 62b exert an axial pressure on the bifurcated end portions of the spring 60 to press the detents 64a and 64b against the confronting face of the ratchet 26.

In a preferred construction, the ratchet 26 has twenty-four teeth 30 and the ratchet wheel 22 has four teeth 24. The actuator plate 12a has a rotary stroke of 25° with each energization thereof.

As clearly visible in FIGURE 1, the pin 18 on the plate 12a is further from the rotary axis defined by the shaft 13 than is the pin 20 from its rotary axis defined by the bushing 38. As a result, the 25° rotary stroke executed by the plate 12a is amplified in the ratchet wheel 22, preferably to 35°.

Also in the preferred construction there are 12 diametrically aligned perforations in the ratchet 26 with the result that the perforations are spaced at 30° rotary intervals. Upon assembly of the device disclosed, the detents 64a and 64b are seated in any diametrically disposed pair of perforations 34 of the ratchet 26.

With the detents properly seated in perforations, as described, the angular phase relationship between the perforations 34 and the ratchet teeth 30 on the ratchet 26 is unimportant. The important consideration is the phase angle between the teeth 24 on ratchet wheel 22 and the teeth 30 on ratchet 26, as established by the length of the transfer arm 16. The length of the arm 16 is preadjusted so that at the end of any return stroke powered by the spring 54 the driving edges of the teeth 24 are approximately 5° behind the driving edges of the confronting teeth 30 in the ratchet 26.

Thus on any power stroke, the ratchet wheel 22 has approximately 5° of lost motion before torque is applied to the ratchet 26. Recalling that the ratchet wheel 22 has 35° total travel, there remains 30° of travel with which to drive the ratchet 26 from one detent position to the next adjacent detent position. Recalling also that the ratchet 26 has twenty-four teeth esablishing 15° increments, the 35° return stroke powered by the spring 54 will cause the teeth 24 on the ratchet wheel 22 to each slip past two teeth on the ratchet 26, then move an extra 5°, approximately, to establish the lost motion previously described.

The purpose of the 5° lost motion is to relax tolerances on the ratchet tooth construction, the lost motion assuring that the teeth 24 will always return more han 30° (two teeth 30) and will never return as much as 45° (three teeth 30). In effect, then, the lost travel provision assures that the ratchet 26 will always be driven the full 30° angle between its detent positions and never more than this full angle.

As clearly shown in FIGURE 2, the detents 64a and 64b have generally spherical end faces which seat in the perforations 34. The spherical curvature of these end faces reduces resistance to movement of the ratchet 26 during the power stroke of the plate 12a and also enables the detents 64a and 64b to precisely locate the ratchet 26 at the end of each power stroke.

To insure positive engagement between the ratchet wheel 22 and the ratchet 26, a curved spring washer 52 is sandwiched between the ratchet 22 and the base 14. The spring washer 52 acts to bias the ratchet wheel 22 upwardly, as viewed in FIGURE 1, against the lower face of the ratchet 26 but yields to permit the ratchet wheel 22 to slip under the ratchet 26 upon counterclockwise rotation of the ratchet wheel 22. As clearly appears in FIGURE 2, both the spring washer 52 and the ratchet wheel 22 encircle and are centered by the bushing 38, this bushing being of sufficient axial length to allow ample clearance for rotation of the wheel 22. The previously mentioned spring 60, which biases the detents 64a and 64b against the ratchet 26 is substantially stronger than the spring washer 52 so as to hold the ratchet 26 during counterclockwise movement of the ratchet wheel 22 and, accordingly, holds the ratchet 26 securely against the upper end of the bushing 38, which shields the ratchet wheel 22 from the pressure of the spring 60.

The solenoid powered actuator 9 is rendered self-stepping in the present invention by means of an interrupter switch controlled by a cam driven by the pivot pin 20 in the ratchet wheel 22. The interrupter switch is assembled upon an insulator 80 secured nonrotatably by the previously described nuts 50a and 50b which have cylindrical projections 81a and 81b, respectively, seated in apertures 82a and 82b, respectively, in the insulator 80.

The interrupter switch includes a resilient spring contact 76 fixed at one end to a mounting post 78 attached to the insulator 80. The opposite end of the spring contact 76 normally engages a stationary contact 84 also fixed to the insulator 80. The spring contact 76 has conductive communication with a terminal 88 through the mounting post 78. Similarly the stationary contact 84 has conductive communication with a terminal 86. By means of conductors not shown, the terminals 86 and 88 are connected electrically in series relation with the operating coil for the actuator 9 and a suitable source of electrical power. Accordingly, whenever the spring contact 76 engages the stationary contact 84, electrical power is supplied to the actuator 9 and, whenever the spring contact 76 is moved away from the stationary contact 84, the supply of power to the actuator is interrupted.

The supply of power to the actuator 9 is controlled in a precisely timed sequence by means of an interrupter cam 66 mounted for rotation with respect to the shaft 28. This cam has radially disposed arms 72a and 72b and, in addition, has a switch operating leg 74 projecting generally radially therefrom. The cam is sandwiched between the previously described plate 44 and a slightly curved spring element 70. The spring 70 is bifurcated at its opposite ends to engage the spacers 62a and 62b and acts to press the cam 66 upwardly against the plate 44. The cam 66 is centered for rotation about the axis of the shaft 28 by means of a wall 67 extruded from the plate 44 and effective to journal the cam 66 between the plate 44 and the spring 70. Friction which would retard rotation of the cam 66 is reduced to an acceptable level by means of steel ball elements 68 fitted into suitable apertures in the cam 66.

In the assembly depicted in FIGURE 1, the arms 72a and 72b of the cam 66 straddle the pivot pin 20 of the ratchet wheel 22. When the pivot pin 20 moves in a counterclockwise direction as occurs during the power stroke of the actuator, the pin 20 bumps against the arm 72b of the cam 66 thereby moving the switch operating leg 74 against a shoulder 75 formed on the resilient switch contact 76. This movement is sufficient to lift the switch contact 76 away from the contact 84 thereby interrupting power to the actuator 9.

The interruption of power to the actuator 9 frees the plate 12a so that the energy stored in the spring 54 will be effective to return the ratchet wheel 22 in a clockwise direction as viewed in FIGURE 1. This return movement causes the pivot pin 20 on the ratchet wheel 22 to bump against the arm 72a of the cam 66 thereby drawing the switch operating leg 74 away from the shoulder 75 on the contact 76, permitting the contact 76 to re-engage contact 84. This restores power to the actuator 9, commencing a new cycle of operation.

The peripheral separation between the arms 72a and 72b is designed with reference to the diameter of the pivot pin 20 so that the switch operating arm 74 open circuits the interrupter switch only at approximately the end of the power stroke and permits restoration of power to the actuator 9 only at substantially the end of the return stroke powered by the spring 54. Thus there is lost travel of the pin 20 between the arms 72a and 72b sufficient to permit completion of both the power and return strokes of the plate 12a.

It is apparent from the description that the structure thus far described is self-operating through an indefinite sequence of cycles wherein, during each cycle, the shaft 28 is advanced precisely, 30°. A commercially important application for devices of this type resides in the advancement of a switch element through an operating sequence. Such an application is illustrated in the drawing wherein a switch deck 90 encircles the shaft 28 above the previously described ratchet assembly.

The switch deck 90 comprises a stationary wafer 94 having apertures 96a and 96b through which the screws 46a and 46b pass. Spacers 102a and 102b establish a clearance between the wafer 94 and the adjacent plate 44 for unobstructed operation of the switch deck 90.

The wafer 94 supports a group of 11 load contacts (only two identified by the reference numbers 92a and 92b being shown) spaced at 30° intervals together with a 12th contact 100 which serves as a feeder contact, the contact 100 having a radially inward extension beyond the contacts 92.

The wafer 94 journals a rotary wafer 97 at the center thereof. The wafer 97 has a double D aperture therein which receives the double D section of the shaft 28 for driving engagement therewith.

The rotary wafer 97 carries an annular contact ring 98 which engages the feeder contact 100. The contact ring 98 carries a contact tab 101 of sufficient radial length to engage the contacts 92, one at a time, as the rotary wafer 97 is rotated.

In one mode of operation, the rotary wafer is first positioned with the tab 101 in the feeder contact 100 which is connected electrically to a source of voltage adequate to operate the loads connected to the load contact. When the rotary solenoid drive is then energized it will self-step the shaft 28 so as to move the tab 101 successively through each of the load contacts, starting with the contact 92a, so as to successively close each of the load contacts. In this manner eleven successive loads may be fired in an accurately timed sequence.

The modification illustrated in FIGURES 3 and 4 operates on the same basic principles as the preferred embodiment but utilizes a re-arrangement and modification of parts so as to produce an even more compact assembly. The power source for the modification comprises a solenoid powered actuator 109 which is housed in the housing 110 and which, in all respects, may be identical to the actuator 9 of the preferred embodiment. The actuator 109 drives a plate 112 through oscillatory 25° strokes so as to move a pivot pin 116 in an oscillatory fashion.

The pivot pin 116 is pivotally engaged to an arm or link 118 which is secured by means of a snap ring 119. The link 118 is biased by a spring 148 engaged at one end in an aperture 150 in the link 118 and engaged at the other end to a post 152 mounted on a base 114 which supports the actuator 109. The spring 148 serves as a reset spring and cooperates with the actuator 109 to impart reciprocal movements to the link 118.

The link 118 has an elongate aperture 120 therein which receives a shaft 122 fixed to a ratchet member 142. Coaxial with the shaft 122 and integral therewith is a pilot 124 journalled in an aperture 126 in a plate 128. The plate 128 is secured against rotation by screws 132a and 132b passing through apertures 130a and 130b in the plate 128 to engage threaded apertures 134a and 134b in the mounting base 114.

The shaft 122 is also journalled for rotation within an extruded wall 138 located on a plate 136 having apertures 140a and 140b receiving the screws 132a and 132b, respectively. The plates 128 and 136 thus cooperate to fix the rotary axis for the shaft 122.

Due to the size of the aperture 120 in the link 118, the reciprocal movements of the link 118 are not restricted by the presence of the shaft 122. The reciprocal movements of the link 118 are caused to advance the ratchet 142 in a step wise fashion in the following manner.

Stuck upwardly from the link 118 is a pawl 154. Stuck downwardly from the plane of the ratchet 142 are axially inclined teeth 144 spaced peripherally in circular array around the margin of the ratchet 142. As the link 118 is pulled by the spring 148 from right to left, as viewed in FIGURE 3, the pawl 154 slips under the teeth 144 without driving engagement. However, as the link 118 is pulled to the right by the actuator 109, the pawl 154 engages a tooth 144 of the ratchet 142 so as to impart rotary movement to the ratchet 142 in proportion to the stroke of the link 118.

As with the preferred embodiment, the actuator 109 has a 25° stroke but the pivot pin 116 is at a sufficient radius on the driven plate 112, and the pawl 154 at a sufficient radial distance from the shaft 122, that the link 118 has a travel with respect to the ratchet 142 effective to subtend a 35° angle relative to the ratchet 142. The ratchet 142 has twenty-four teeth establishing 15° intervals between teeth. Accordingly, with proper alignment of the ratchet 142, the pawl 154, during each return stroke powered by the spring 148 will pass over two teeth (30°) with approximately 5° overtravel. Then, on the ensuing power stroke, the pawl 154 will have 5° lost motion before engaging a tooth 144 and advancing the ratchet 142 through a 30° stroke.

The ratchet 142 is held at the end of each power stroke of the actuator 109 and, until such time as a new power stroke is initiated, by means of a detent assembly utilizing a circular array of perforations 146 in the rachet 142 and a spring member 158 carrying diametrically disposed detent elements 156a and 156b. The spring member 158 is bifurcated to engage spacers 160a and 160b which are secured by the screws 132a and 132b. Annular shoulders on the spacers 160a and 160b engaging the furcations in the spring member 158 effect a distortion of the spring member 158 so as to establish a bias in the spring member 158 pressing the detents 156a and 156b against the confronting face of the ratchet 142. The detents 156a and 156b enter the aperture 120 of the link 118 and thus do not interfere with the link movement.

For proper functioning of the present modification, it is apparent that the detent elements 156a and 156b must project outwardly from the spring 158 a distance exceeding the thickness of the link 118, which thickness has being exaggerated in the drawing. To satisfy this requirement, thin sheet stock not more than a few mils thick is employed in fabricating the link 118. The use of a comparatively thin sheet stock in the present embodiment poses no difficulty since the spring 148 and the actuator 109 cooperate to maintain the link 118 under tension at all times and all work performed by the link 118 is accomplished under a tensive load as opposed to a compressive load.

For establishing a self-stepping action in the modification, an interrupter switch and cam functionally identical to the corresponding elements of the preferred embodiment is employed. The interrupter switch 171, which has a flexible contact 172 and is of substantially the same construction as the interrupter switch of the preferred embodiment, is mounted upon a wafer 174 secured against rotation by the screws 132a and 132b which enter apertures 176a and 176b of the wafer. The wafer 174 has an enlarged central aperture which receives the ratchet 142 without interference to the operation of this ratchet. The wafer 174 is assembled under the previously described plate 128 and is pressed against this plate by spacers 160a and 160b which are too large in diameter to pass through the apertures 176a and 176b. As previously mentioned, the detent elements 156a and 156b project outwardly from the spring 158 a distance sufficient to accommodate the link 118. Accordingly, the wafer 174, which is substantially of the same thickness as the ratchet 142 does not interfere with the movements of the link 118.

The interrupter switch is operated by the cam 162 which has peripherally spaced arms 164 and 166. This cam is supported for rotation with respect to the shaft 122 on a plate 136 which has an extrusion 138 providing a journal or bearing for the cam 162.

The cam 162 is held against the plate 136 by means of a spring 170 bifurcated at the opposite ends thereof to engage the spacers 160a and 160b. Ball bearing elements 168 fitted into suitable apertures in the cam 162 minimize friction between the cam 162, the plate 136 and the spring 170.

The cam 162 is operated by a lug 179 struck downwardly from the link 118. The lug 179 bumps against the arms 164 and 166 of the cam 162 as the link 118 approaches the ends of its reciprocal movements. As the link 118 is driven to the end of the power stroke by the actuator 109, the lug 179 engages the cam arm 166, pivoting the arm 164 against the resilient interrupter switch contact 172, thus interrupting power to the actuator 109. As the link 118 is drawn through the return stroke by the spring 148, the lug 179 has free or lost travel until it engages the cam arm 164 whereupon the resilient contact 172 is released and power restored to the actuator 109.

As was the case with the preferred embodiment, the driven load may be any one of a number of operating mechanisms and, for illustration only, a switch mechanism 180 is schematically illustrated in FIGURE 3. This mechanism includes a stator wafer 184 mounting load contacts 182 and secured against rotation by the screws 132a and 132b which enter perforations 186a and 186b in the stator wafer. The stator wafer 184 journals a rotor wafer 194 carrying an annular ring contact 196. As previously discussed, a tab 198 carried by the contact 196 can be successively wiped through the stator contacts 182 in automatic sequence upon delivery of power to the actuator 109.

Spacers 188a, 188b, 190a, 190b, 192a, and 192b flanking the wafer 184 enable the screws 132a and 132b to be drawn up tightly toward the base 114 without obstruction to free rotary movement of the rotor wafer 194 in the switch assembly.

In both the preferred embodiment and the modification of FIGURES 3 and 4, the arm or link by which power is transmitted from the actuator to the driven ratchet assemblies is shown as having an offset between the pivot pin on the rotary actuator and the driven load. In both cases the offset is downwardly toward the base which supports the actuator. This offset enables the rotary actuator to stand as high as possible with respect to the driven load, thus allowing the actuator to have the largest possible solenoid coil commensurate with the overall compactness of the final assembly. This in turn allows a maximum of power in the smallest possible package.

The offset in the arm or link which transfers power from the actuator to the driven load offers a further advantage in that it develops a slight downward bias on the rotary elements of the actuator. This helps to remove play from the rotary elements of the actuator, thus minimizing the possibility of variation in the strokes delivered by the actuator.

It will be recognized by those skilled in the art that the technique of placing the rotary driving member and the rotary driven load on separate parallel axes and employing a link to transfer power from one axis to the other offers a unique flexibility in design. Thus without interfering with the basic stroke developed in the rotary actuator, which serves as a prime mover, the present assembly can accommodate a wide variation in output stroke sizes which can be established merely by adjusting the effective lever arms established between the pivot pins and their rotational axes. In a similar fashion, adjustments in the torque applied to the driven load are possible by moving the pivot pins further away from or closer to the rotary axes for the driving and driven assemblies. Another beneficial feature is that the present design accommodates a short stroke rotary actuator with the result that the actuator can operate in its most efficient torque range.

Although the preferred embodiments of the device have been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described our invention, we claim:
1. A device of the class described comprising: a rotary assembly including a driven shaft, a stationary assembly supporting said shaft for a rotation about a longitudinally axis of said shaft, a reciprocal drive assembly comprising a link disposed generally perpendicular to said longitudinal axis and means to drive said link reciprocally in directions substantially perpendicular to said longitudinal axis, a ratchet plate fixed nonrotatably to said shaft and disposed in a plane normal to said longitudinal axis, said ratchet plate having a circular array of peripherally spaced ratchet teeth projecting axially from one face thereof, said array of teeth being concentric to said longitudinal axis, a pawl adapted to engage said teeth, said pawl comprising at least one tooth of a complementary ratchet wheel confronting said circular array of ratchet teeth and mounted for rotation relative to said shaft, said ratchet wheel supporting a pivot pin spaced from said shaft pivotally engaging said link, said link reciprocating said ratchet wheel to move said pawl reciprocally over said ratchet teeth so as to impart a stepwise rotary movement to said ratchet plate and said shaft, said ratchet plate having a detent portion on one face thereof, detent means adapted to yieldingly engage said detent portion, and spring means mounted on said stationary structure biasing said detent means axially against said one face of said ratchet plate to urge said detent means into engagement with said detent portion, said spring means engaging and holding said detent means against rotary movement about the longitudinal axis of said shaft.

2. A device of the class described comprising: a rotary assembly including a driven shaft, a stationary assembly supporting said shaft for rotation about a longitudinal axis of said shaft, a reciprocal drive assembly including a solenoid coil, a source of electrical power for energizing said coil, an interrupter switch, conductor means connecting said coil in series with said source of power and with said interrupter switch, a link disposed generally perpendicular to said longitudinal axis, means responsive to energization of said coil to move said link in a first direction and means responsive to a predetermined travel of said link in said first direction to open said interrupter switch so as to interrupt the supply of electrical power to said coil, a ratchet plate fixed nonrotatably to said shaft and disposed in a plane normal to said longitudinal axis, said ratchet plate having an annular array of peripherally spaced ratchet teeth projecting axially from one face thereof, said array of teeth being concentric to said longitudinal axis, a pawl adapted to engage said teeth and drivingly connected to said link, said link driving said pawl reciprocally over said ratchet teeth so as to impart a stepwise rotary movement to said ratchet plate and said shaft, said ratchet plate having a detent portion on one face thereof, detent means adapted to yieldingly engage said detent portion, and spring means mounted on said stationary assembly biasing said detent means axially against said one face of said ratchet plate to urge said detent means into engagement with said detent portion, said spring means engaging and holding said detent means against rotary movement about the longitudinal axis of said shaft.

3. The device according to claim 2 wherein said drive assembly includes spring means connected to said link and to said stationary assembly resisting movement of said link in said first direction and effective to return said link through said predetermined travel upon deenergization of said coil.

4. The device according to claim 3 wherein said interrupter switch includes a stationary contact supported by said stationary assembly and a movable contact supported by said stationary assembly, and wherein the means to open said interrupter switch comprises cam means mounted for rotation about said shaft, and means engaged with said link to move said cam means against said movable contact upon travel of said link said predetermined distance in said one direction.

5. The device according to claim 4 wherein said pawl comprises at least one tooth of a complementary ratchet wheel confronting said circular array of ratchet teeth and mounted for rotation relative to said shaft, said ratchet wheel supporting a pivot pin spaced from said shaft pivotally engaging said link, and wherein said means engaged with said link comprises an extension of said pivot pin.

6. The device according to claim 4 wherein the means engaged with said link for moving said cam means comprises a lug fixed to said link.

7. A device of the class described comprising: first and second rotary assemblies, a stationary assembly supporting said first and second rotary assemblies for rotation on spaced and generally parallel first and second axes, respectively, a link generally spanning the distance between said axes and spaced from said axes, said first assembly including a first rotary member pivotally attached to said link, said second assembly including a ratchet member rotatable about said second axis, pawl means connected to and driven by said link and adapted to drivingly engage said ratchet, said stationary assembly including deenergizible power means to drive said first rotary assembly through a limited arc in one direction whereby said link is driven a limited distance in a first direction, resilient means engaging and resisting said movement of said link in said first direction, said resilient means operating to return said link in a second direction opposite to said first direction upon deenergization of said power means, said pawl means drivingly engaging said ratchet in one of said first and second directions.

8. The device according to claim 7 including means operatively engaging said ratchet to hold said ratchet against movement by said pawl means in said second direction.

9. The device according to claim 7 wherein said power means includes an electromagnet, a source of electrical power for said electromagnet, and an interrupter switch in series with said electromagnet and said source of power, said second rotary assembly including cam means to operate said switch mounted on said stationary assembly for rotation with respect to said second axis, said link carrying operating means engaging said cam means with lost motion, said operating means moving said cam means to open said interrupter switch upon said link reaching the end of its travel in one of said first and second directions and moving said cam means to close said interrupter switch upon said link reaching the end of its travel in the other of said first and second directions.

10. The device according to claim 7 wherein said power means includes an electromagnet mounted on said stationary assembly and an armature attracted to said electromagnet upon energization thereof, said power means including rotary means responsive to attraction of said armature to said electromagnet to rotate said first rotary member.

11. The device according to claim 10 wherein said electromagnet attracts said armature axially in a first direction along said first axis wherein said yielding means operates through said link to apply an axial bias to said rotary member in said first direction.

12. A device of the class described comprising: a rotary element, a stationary assembly supporting said rotary element for rotation about a first axis, a reciprocal drive assembly mounted on said stationary assembly, a ratchet member and a pawl member, one of said members being drivingly connected to said rotary element, elongated link means connected at one portion thereof to said drive assembly and at another portion thereof to the other of said ratchet and pawl members, said drive assembly reciprocating said link means along a second axis substantially parallel to the longitudinal axis of said link means and substantially perpendicular to said first axis, said ratchet member having an annular array of spaced teeth encircling said first axis, said teeth each having an axially projecting radially extending wall and an axially inclined peripherally extending surface, adjacent teeth in said array defining a notch bounded by the wall of one and the inclined surface of the other, there being one notch defined by each pair of adjacent teeth, yielding means biasing said other of said ratchet and pawl elements axially toward said one of said ratchet and pawl elements to seat said pawl in one of said notches, said link means transferring the reciprocal movement of said drive assembly to said other of said ratchet and pawl members whereby said pawl member has driving engagement with said ratchet when the direction of said reciprocal movement creates pressure between said pawl member and said wall of said one notch, and means yieldingly opposing rotary movement of said rotary element with force sufficient to cause said ratchet and pawl members to slip in the opposite direction of said reciprocal movement due to camming movement between said pawl and the other inclined surface of said one notch against the axial force of said yielding bias means.

13. The device according to claim 12 wherein said drive assembly includes a rotary part supported for rotation on a third axis spaced from and parallel to said first axis, and means to impart reciprocal rotary movement to said rotary part; said one portion of said link means engaging said rotary part in spaced relation to said third axis.

14. A device of the class described comprising: first and second rotary elements, support means mounting said first rotary element for rotation about a first axis, said support means supporting said second rotary element for rotation through a limited angle about a second axis generally parallel to and spaced from said first axis, motive means to reciprocate said second rotary element through said limited angle, a link, first pivot means pivotally attaching a first portion of said link to said first rotary element, second pivot means pivotally attaching a second portion of said link spaced from said first portion to said second rotary element, said first and second pivot means being spaced, respectively, from said first and second axes whereby said link transmits the reciprocal movements of said second rotary member to said first rotary member and said first rotary member is thereby reciprocated through a limited angle the magnitude of which is dependent upon the relative spacings of said first and second pivot means from said first and second axes, respectively, an output member supported by said support means for rotation about said first axis, and one way clutch means coupling said first rotary element to said output member whereby said output member is unidirectionally rotated by said first rotary member through successive angles the magnitude of which is dependent upon said relative spacings of said first and second pivot means.

15. The device of claim 14 wherein said motive means includes an electromagnet and an armature attracted to said electromagnet in a direction along said second axis upon energization of said electromagnet.

References Cited
UNITED STATES PATENTS

| | | | |
|---|---|---|---|
| 558,256 | 4/1896 | Bush | 335—272 X |
| 665,143 | 1/1901 | Stull. | |
| 1,154,976 | 9/1915 | Cutler | 335—123 |
| 1,757,392 | 5/1930 | Schieferstein | 74—26 |
| 2,990,462 | 6/1961 | Dietz | 335—123 X |
| 1,334,037 | 3/1920 | Kaisling | 335—123 |
| 2,496,880 | 2/1950 | Leland | 335—228 |
| 2,926,534 | 3/1960 | Fritsch | 74—575 |
| 3,090,555 | 5/1963 | Hell. | |

GEORGE HARRIS, *Primary Examiner.*

HAROLD BROOME, *Assistant Examiner.*

UNITED STATES PATENT OFFICE
CERTIFICATE OF CORRECTION

Patent No. 3,405,376                                           October 8, 1968

Clifford C. Giese, Jr., et al.

It is hereby certified that error appears in the above numbered patent requiring correction and that the said Letters Patent should read as corrected below.

Column 8, line 61, for "longitudinally" read -- longitudinal --; column 10, lines 42 to 44, strike out "wherein said yielding means operates through said link to apply an axial bias to said rotary member in said first direction".

Signed and sealed this 19th day of November 1968.

(SEAL)
Attest:

Edward M. Fletcher, Jr.                                EDWARD J. BRENNER
Attesting Officer                                         Commissioner of Patents